Sept. 3, 1929.  O. STRATTON ET AL  1,727,257
BAKING PAN
Filed May 25, 1928
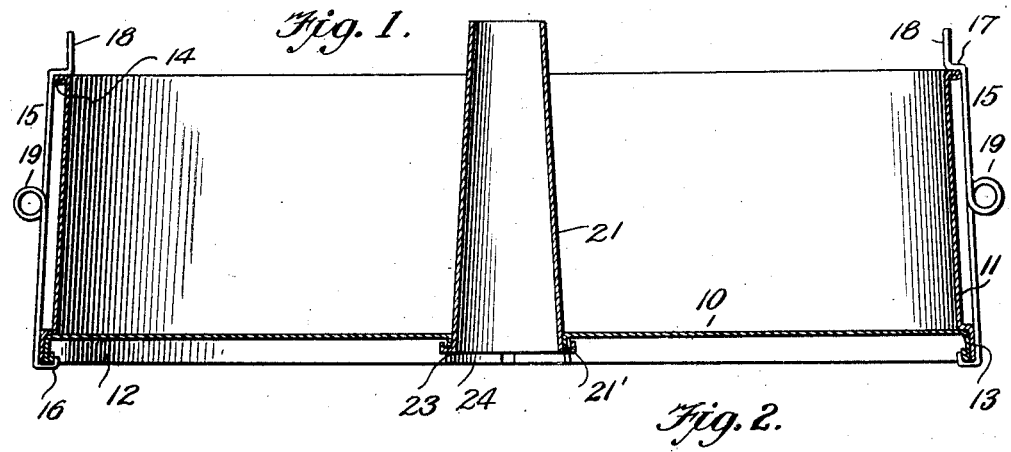
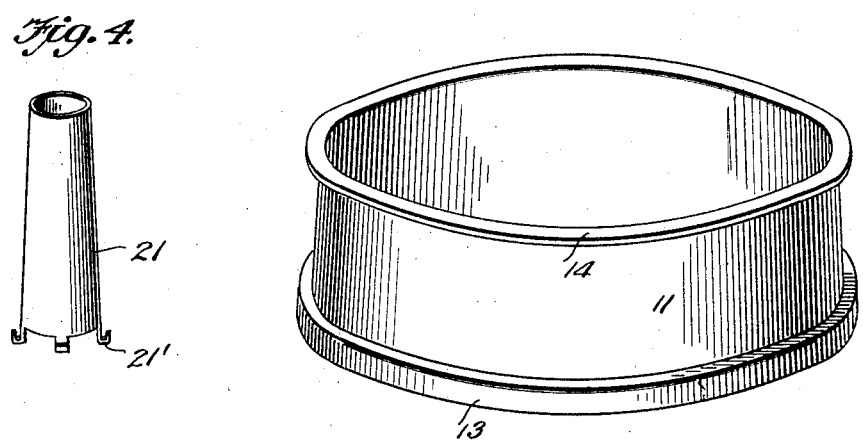
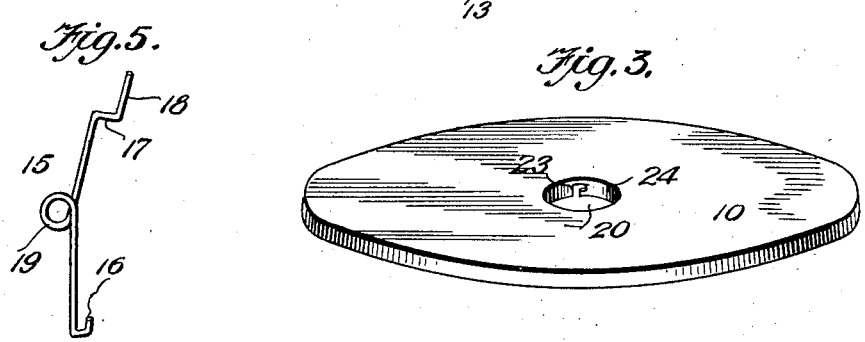
O. Stratton
M. B. Hefner
INVENTOR
BY Victor J. Evans
ATTORNEY Patented Sept. 3, 1929.

1,727,257

UNITED STATES PATENT OFFICE.

OSCAR STRATTON AND MILLIE B. HEFNER, OF BETHANY, MISSOURI.

BAKING PAN.

Application filed May 25, 1928. Serial No. 280,589.

This invention relates to improvements in baking pans, an object being to provide a pan of sectional construction, from which the sides may be removed without disturbing the contents of the pan.

To this end, the invention provides a pan having removable side walls which are mounted upon the base of the pan and engaged therewith and held in engaged position by removable clamping members, so that after the baking operation, the side walls may be removed without disturbing and possibly breaking the cake.

Another object of the invention is the provision of a removable conical tube which is carried by the bottom or base of the pan and which is detachably connected therewith so that this tube may be removed when desired without disturbing the cake, and the opening for the tube utilized to receive the upper end of a pedestal or standard and thus add to the attractiveness of the tray.

With the above and other objects in view, the invention further includes the following novel features and details of construction, to be hereinafter more fully described, illustrated in the accompanying drawings and pointed out in the appended claims.

In the drawings:—

Figure 1 is an enlarged sectional view illustrating the invention for use as a baking pan.

Figure 2 is a perspective view of the side walls removed from the base.

Figure 3 is a perspective view of the base.

Figure 4 is a detail perspective view of the conical tube.

Figure 5 is a detail perspective view of one of the clamping members.

Referring to the drawings in detail wherein like characters of reference denote corresponding parts, the reference character 10 indicates the base of a baking pan which pan includes side walls 11. The pan is shown as of circular configuration, but any desired shape may be provided.

The base is preferably provided with a downwardly extending flange 12 so that the base will be spaced above a table or other support, or spaced above the bottom of an oven. The side walls 11 are provided with an offset annular flange 13 which extends around the bottom edge of the side walls and which provides a seat for the edge of the base. The upper edge of the side walls 11 is also preferably provided with an annular flange 14. The side walls are thus removably mounted upon the base and in order to clamp the base and side walls together, the invention provides clamping members 15. One of these members is illustrated in detail in Figure 5 of the drawings and is preferably formed of spring wire having a hook 16 at one end to engage beneath the flange 11 of the base and the offset flange 13 of the side walls 11 so as to clamp these flanges together. The upper end of each of the clamping members is provided with a rightangular offset 17 which engages over the upper flange 14 and has extending therefrom a finger piece 18. Each of the clamping members is provided intermediate its ends with a spring loop 19 whose tendency is to force the upper end of the clamping member inwardly over the flange 14 so as to hold the clamping member securely in position. In addition, this loop 19 forms a finger piece or handle, by means of which the pan may be conveniently handled.

The base 10 may be provided with a central opening 20 through which extends a conical tube 21, whose purpose is to provide a central opening in a cake.

The tube 21 has extending from its lower end substantially L-shaped projections or fingers 21' and these fingers are adapted to be removably received within bayonet slots 23 provided in a flange 24 which surrounds the opening 20. In this position, the tube will engage the inner face of the flange, the projections or fingers passing through the slots and engaging the outer face of said flange.

After the pan has been used for baking purposes, the side walls 11 may be removed from the base by disengaging the clamping members 15, and the tube 21 may also be removed.

The invention is susceptible of various changes in its form, proportions and minor details of construction and the right is herein reserved to make such changes as properly fall within the scope of the appended claim.

Having described the invention what is claimed is:—

A baking pan comprising a base, side walls, an offset annular flange extending around the lower edge of the side walls for removable engagement over the edge of the base, means to clamp the side walls upon the base, said base having a central opening therein, a flange surrounding the opening and extending parallel with the axis of said opening and having oppositely located bayonet slots therein, a conical tube removably positioned within the opening and engaging the inner face of the flange, and downwardly extending hook-shaped projections carried by the tube for passage through the slots and engaging the outer face of said flange to removably hold the tube in position.

In testimony whereof we affix our signatures.

OSCAR STRATTON.
MILLIE B. HEFNER.